United States Patent
Tenneti et al.

(10) Patent No.: US 8,019,343 B2
(45) Date of Patent: *Sep. 13, 2011

(54) SUPPORT FOR HANDOFFS IN HIGH RATE PACKET DATA SYSTEMS

(75) Inventors: Surya Tenneti, Richardson, TX (US); Sanket Nesargi, Richardson, TX (US); Jun Li, Richardson, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 167 days.

This patent is subject to a terminal disclaimer.

(21) Appl. No.: 12/387,621

(22) Filed: May 5, 2009

(65) Prior Publication Data

US 2009/0225723 A1 Sep. 10, 2009

Related U.S. Application Data

(63) Continuation of application No. 11/295,232, filed on Dec. 6, 2005, now Pat. No. 7,546,124.

(60) Provisional application No. 60/633,868, filed on Dec. 7, 2004.

(51) Int. Cl.
*H04W 36/00* (2009.01)
(52) U.S. Cl. ......... 455/436; 455/439; 455/442; 455/438
(58) Field of Classification Search .............. 455/436, 455/439, 442, 438, 443, 445, 452.1, 456.1, 455/403, 432.1; 370/310, 328, 329, 331
See application file for complete search history.

(56) References Cited

U.S. PATENT DOCUMENTS

| | | | | |
|---|---|---|---|---|
| 6,909,899 B2 * | 6/2005 | Wang et al. | ................. | 455/436 |
| 7,085,251 B2 * | 8/2006 | Rezaiifar | .................. | 370/331 |
| 7,103,662 B2 * | 9/2006 | Ray et al. | .................. | 455/438 |
| 7,280,505 B2 * | 10/2007 | Chaskar et al. | .............. | 370/331 |
| 7,590,092 B2 * | 9/2009 | Milton et al. | ................ | 370/331 |
| 2006/0274692 A1 * | 12/2006 | Ryu | .............................. | 370/331 |

OTHER PUBLICATIONS

"Introduction to CDMA2000 1x/1x-EV-DO"; RADCOM (Aug. 2003).
"1xEV: 1xEVolution IS-856 TIA/EIA Standard"; QUALCOMM, Inc. (Nov. 7, 2001).
Ergut, Salliah; "cdma2000 Radio Access Network"; Jul. 7, 2003.
Molloy, Kieran; "Seamless Handoff Between 802.11b and CDMA2000 Networks"; Univ. of Canterbury (Nov. 7, 2003).

(Continued)

*Primary Examiner* — Sonny Trinh
(74) *Attorney, Agent, or Firm* — D. Scott Hemingway; Hemingway & Hansen, LLP

(57) ABSTRACT

The invention supports two types of handoffs. The first handoff is for an inter-AN cell selection where the source AN allows the AT to add a cell under the control of a different AN to its active set and then allows the AT to switch to the target AN. A bearer path is established between the source and target AN to transfer the packet data traffic using an exchange of messages to register the AT's movement from one BTS to another BTS. The A8/A10 connections remain anchored at the source AN and, hence, a bearer path is needed between the source and target AN to transfer the packet data traffic. The second handoff occurs when the source AN specifies a move of the AT to a new AN proactively. New connections are established at the target AN to support the AT, and the AT is subsequently moved to the target AN via the relevant air-interface messaging.

20 Claims, 2 Drawing Sheets

OTHER PUBLICATIONS

Shyy, D.J.; Fast Layer 2 Handoff Between WLAN and 3G Cellular Networks; Defense Information System Agency (2004).
"VoIP over 1xEV-DO"; Airvana (Nov. 5, 2004).
Bhalla, Rajesh, M. Chiba, and G. Dommety: "Fast handoff in cdma2000 Wireless IP Networks"; Cisco Systems (Dec. 4, 2000).

* cited by examiner

SUPPORT FOR HANDOFFS IN HIGH RATE PACKET DATA SYSTEMS

RELATED APPLICATION DATA

This application is related to Provisional Patent Application Ser. No. 60/633,868 filed on Dec. 7, 2004, and priority is claimed for this earlier filing under 35 U.S.C. §119(e), and this application is related to application Ser. No. 11/295,232 filed on Dec. 6, 2005, and priority is also claimed for this earlier filing under 35 U.S.C. §120. The Provisional Patent Application and prior Application are incorporated by reference into this utility patent application.

TECHNICAL FIELD OF THE INVENTION

A method for handling hand-offs in a High Rate Packet Data (HRPD) system.

BACKGROUND OF THE INVENTION

The Internet, like so many other high tech developments, grew from research originally performed by the United States Department of Defense. In the 1960s, the military had accumulated a large collection of incompatible computer networks. Computers on these different networks could not communicate with other computers across their network boundaries.

In the 1960s, the Defense Department wanted to develop a communication system that would permit communication between these different computer networks. Recognizing that a single, centralized communication system would be vulnerable to attacks or sabotage, the Defense Department required that the communication system be decentralized with no critical services concentrated in vulnerable failure points. In order to achieve this goal, the Defense Department established a decentralized standard communication protocol for communication between their computer networks.

A few years later, the National Science Foundation (NSF) wanted to facilitate communication between incompatible network computers at various research institutions across the country. The NSF adopted the Defense Department's protocol for communication, and this combination of research computer networks would eventually evolve into the Internet.

Internet Protocols

The Defense Department's communication protocol governing data transmission between different networks was called the Internet Protocol (IP) standard. The IP standard has been widely adopted for the transmission of discrete information packets across network boundaries. In fact, the IP standard is the standard protocol governing communications between computers and networks on the Internet.

The IP standard identifies the types of services to be provided to users and specifies the mechanisms needed to support these services. The IP standard also specifies the upper and lower system interfaces, defines the services to be provided on these interfaces, and outlines the execution environment for services needed in the system.

In a typical Internet-based communication scenario, data is transmitted from an originating communication device on a first network across a transmission medium to a destination communication device on a second network. After receipt at the second network, the packet is routed through the network to a destination communication device using standard addressing and routing protocols. Because of the standard protocols in Internet communications, the IP protocol on the destination communication device decodes the transmitted information into the original information transmitted by the originating device.

The IP-Based Mobility System

The Internet protocols were originally developed with an assumption that Internet users would be connected to a single, fixed network. With the advent of cellular wireless communication systems using mobile communication devices, the movement of Internet users within a network and across network boundaries has become common. Because of this highly mobile Internet usage, the implicit design assumption of the Internet protocols (e.g. a fixed user location) is violated by the mobility of the user.

In an IP-based mobile communication system, the mobile communication device (e.g. cellular phone, pager, computer, etc.) can be called a mobile node or mobile station. Typically, a mobile station maintains connectivity to its home network while operating on a visited network. The mobile station will always be associated with its home network for IP addressing purposes and will have information routed to it by routers located on the home and visited networks.

Packet-Based Communication Systems

In Internet Protocol (IP) networks, the communication process is very different from prior conventional telecommunication systems. In an IP network communication, there is no open switched connection established between the caller and recipient devices. The information being transmitted between the caller and recipient devices is broken into packets of data, and each packet of data is transmitted to the recipient device in pieces. The data packets individually contain routing information to direct each packet to the recipient device. These packets are then reassembled into a coherent stream of data at the recipient device.

The Internet protocols were originally developed with an assumption that Internet users would be connected to a single, fixed network. With the advent of cellular wireless communication systems using mobile communication devices, the movement of Internet users within a network and across network boundaries has become common. Because of this highly mobile Internet usage, the implicit design assumption of the Internet protocols (e.g. a fixed user location) is violated by the mobility of the user.

In an IP-based mobile communication system, the mobile communication device (e.g. cellular phone, pager, computer, etc.) can be called a Mobile Node. Typically, a Mobile Node maintains connectivity to its home network through a foreign network. The Mobile Node will always be associated with its home network for IP addressing purposes and will have information routed to it by routers located on the home and foreign networks. The routers can be referred to by a number of names including Home Agent, Home Mobility Manager, Home Location Register, Foreign Agent, Serving Mobility Manager, Visited Location Register, and Visiting Serving Entity.

Cellular Communication Systems

A typical cellular communication system is comprised of multiple cell sites, each covering an intended geographic region. Each of the cell sites can be assigned an address for routing information packets, and each of the Mobile Nodes can be assigned an address for their physical connectivity to the cell site.

Each cell site supports voice and data communication to the linked Mobile Nodes present within that geographic area. A wireless communication link is maintained by a transceiver at or very near the center of the cellular coverage area. The transceiver is coupled to a base station transceiver substation which is coupled to a base station controller, with controls the packet transmissions within the cell site area. The base station controller is also coupled to a mobile switching center, which routes calls handled by the base station controller and base transceiver station to a public switched telephone network or a packet data service node interface with the Internet.

Information packets on the communication system are processed by the base station controller for transmission to the public switched telephone network or the Internet. The base station controller processes the information packets for transmission to the public switched telephone network, the Internet, or the Mobile Node. As a Mobile Node moves across cellular boundaries, it changes its connectivity and its connectivity address. Routers on the communication network have to be updated with this new connectivity address so that information packet can continue to be properly routed. The address used for routing can be a single IP address, a combination of an IP address and a connectivity address, or some other similar addressing scheme providing packet routing data on the communication network corresponding to the physical connectivity of the Mobile Node.

Telecommunication networks are complex networks used to establish connections between two or more telecommunication devices. Frequently, the devices involved with a telecommunications call or connection are referred to as the originating device and the terminating device. The user typically enters an identifying number into the originating device of the terminating device to which a call is to be placed. The network responds to entry of the identifying number of the terminating device and performs a call setup procedure that establishes, among other things, a connection between the originating device and the terminating device using IP addressing. Call data, voice or multimedia, is then routed between the two devices according the IP addressing assigned to each device.

Voice and data transmitted according to the IP packet standard is the evolving and most current communication protocol for cellular telephone communication. With this migration to the IP standard and miniaturization of computer chip technology with dramatic increases in clock speeds, computational power, and memory storage has come increasingly sophisticated services such as email access, streaming video and audio data transfers, instant messaging, text messaging, multimedia applications, picture messaging, Internet website access, e-commerce applications, games and other services. Cell phones have accordingly evolved from relatively crude devices limited to telephony communication to near minicomputers with operating features and capabilities equal to if not superior to early personal computers.

Code Division Multiple Access (CDMA) is an evolving third generation communication system standard for wireless communication systems that can transmit multimedia services using the packet-based Internet protocol. These CDMA mobile communication systems support multimedia telecommunication services delivering voice (VoIP) and data, to include pictures, audio, video, streaming video, messaging, and other multimedia information over mobile wireless connections.

As the capability of the various communication standards have improved, there has been an increasing need for high-speed transmissions and increased user capacity. A new CDMA packet air interface has been developed that offers improvements over earlier CDMA systems by implementing high-speed shared-traffic packet data channels on the forward air-link connection. Recent developments include CDMA-based 1xEV systems operating at 1.25 MHz. The 1.25 MHz carrier delivers high data rates and increased voice capacity. 1xEV is a two-phase strategy. One phase is designated 1xEV-DO, which handles data only. The 1xEV-DO standard provides user with peak data rates of 2.4 Mbits/s. The other phase is 1xEV-DV, for data and voice. Other standards are evolving that also make use of the shared packet channel and multiplex packet communication for high-speed data and voice communication.

On the CDMA standard, Mobile Nodes, or Access Terminal (AT), roam within and across cellular communication sites. Each of the cells possesses one or more transceivers coupled to a Base Transceiver Station (BTS) onto the communication network. The BTSs are in turn coupled to an Access Network. As an AT migrates across cellular borders, its BTS physical connection changes. An AT can be physically located anywhere on the network or sub-network, and its routing address data will change and require updating on other nodes. Wireless IP networks handle the mobile nature of AT with hand-off procedures designed to update the communication network and sub-network with the location of the mobile node for packet routing purposes. Because mobile nodes can move within sub-networks and between networks, hand-off procedures are needed to insure that packets are continually routed to the recipient AT as it moves from one network to another or from one sub-network to another.

As the CDMA standard evolves, newer methods and enhancements to transmitting packets on the network are being developed and deployed. There is a currently a need for a hand-off method compliant with the Interoperability Specification (e.g. TIA 856A and TIA 1054), which defines a standardized protocol interface between the base station and packet-switching equipment (PDSN, PCF). This will provide a standardized method for performing hand-offs.

SUMMARY OF THE INVENTION

The invention supports two types of handoffs. The first handoff is for an inter-AN cell selection where the source AN allows the AT to add a cell under the control of a different AN to its active set and then allows the AT to switch to the target AN. A bearer path is established between the source and target AN to transfer the packet data traffic using an exchange of messages to register the AT's movement from one BTS to another BTS. The A8/A10 connections remain anchored at the source AN and, hence, a bearer path is needed between the source and target AN to transfer the packet data traffic.

The second handoff occurs when the source AN specifies a move of the AT to a new AN proactively. New connections are established at the target AN to support the AT, and the AT is subsequently moved to the target AN via the relevant air-interface messaging.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
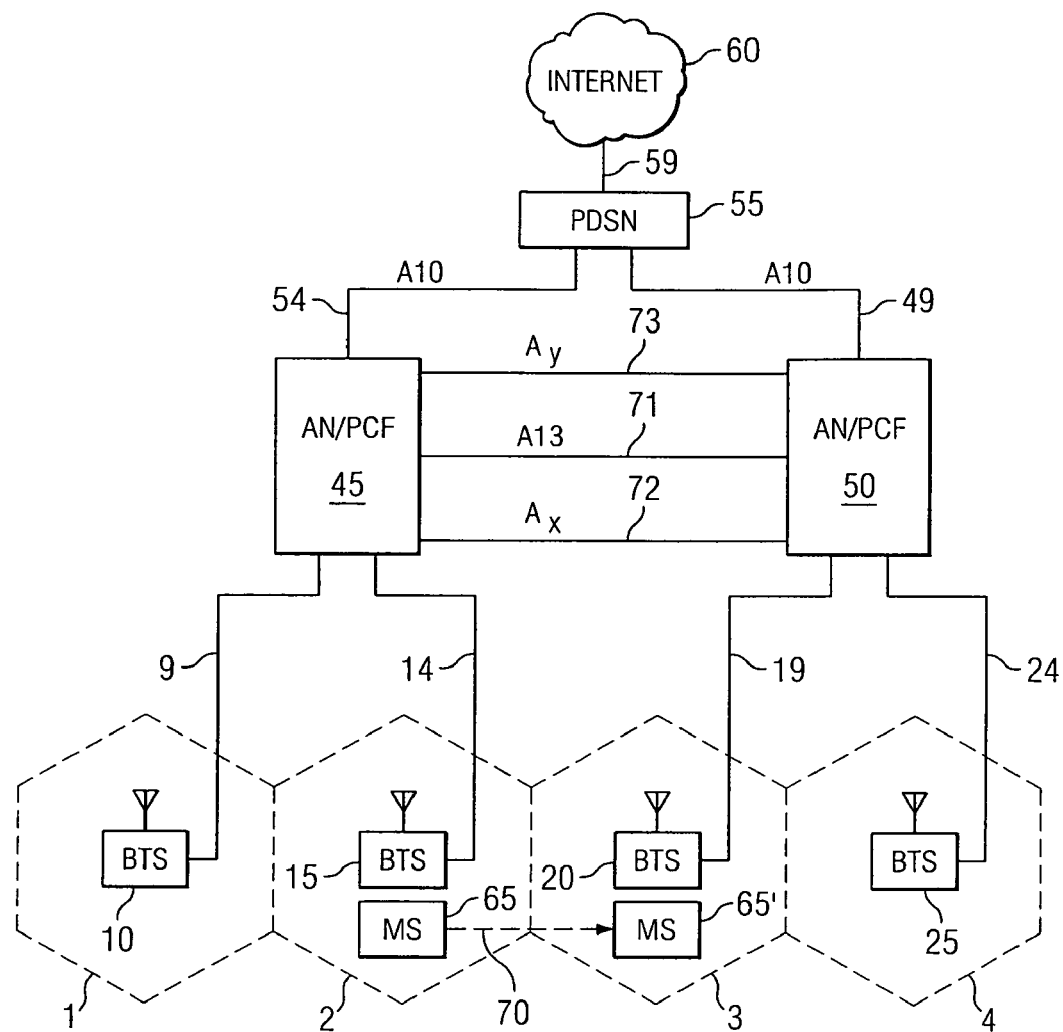
FIG. 1 is a schematic diagram of the functional elements of a wireless communication network utilizing the invention for an Inter-AN cell selection based on an implementing architecture for a CDMA system.

FIG. 1 shows the typical CDMA cellular communication system components utilizing the invention. Referring to FIG. 1, cell site 1 supports wireless communication with mobile stations (e.g. cellular phones, laptop computers, palm pilot devices, etc.) within that cell site service area. A base transceiver station (BTS) 10 provides the radio signal link to the mobile stations on the cell site 1. Cell site 2 supports wireless communication with mobile stations (e.g. cellular phones, laptop computers, palm pilot devices, etc.) within that cell site service area. A base transceiver station (BTS) 15 provides the radio signal link to the mobile stations on the cell site 2. Cell site 3 supports wireless communication with mobile stations (e.g. cellular phones, laptop computers, palm pilot devices, etc.) within that cell site service area.

A base transceiver station (BTS) 20 provides the radio signal link to the mobile stations on the cell site 3. And cell site 4 supports wireless communication with mobile stations (e.g. cellular phones, laptop computers, palm pilot devices, etc.) within that cell site service area. A base transceiver station (BTS) 25 provides the radio signal link to the mobile stations on the cell site 4.

The BTS 10 is coupled to the Access Network/Packet Control Function (AN/PCF) 35 by communication link 9. The PCF in this network stores HRPD session related information, assigns the unicast access identifier to the access terminal, performs terminal authentication procedures, and manages the location of the access terminal. The Access Terminal (AT) 65 is shown on cell site 2 coupled to BTS 15 by wireless radio link 62. The mobile station is linked to the BTS 15 by radio signal 62. The AN/PCF 45 is coupled to the Packet Data Serving Node (PDSN) 55 by communication link 54. The communication link 54 can be referred to as the A10 interface and it carries user traffic between the PCF functionality of AN/PCF 45 and the PDSN 55. The PDSN 55 is in turn coupled to the Internet 60 by communication link 59.

The BTS 20 is coupled to the AN/PCF 50 by communication link 19. The AN/PCF 50 is coupled by communication link 49 to the PDSN 55. AN/PCF 45 and AN/PCF 50 are also linked by communication interface 71, which is also referred to as the A13 interface, which carries signaling information between the PCF functions, communication interface 72, also referred to as the Ax interface, which carries signaling traffic between AN/PCF 35 and AN/PCF 50 functions, and interface 73, the Ay interface, which is the bearer path established between the AN/PCF 35 and AN/PCF 50 carrying the message traffic to and from the AT and PDSN. Ay interface carries both the signaling traffic needed to establish the connection as well as bearer traffic between AN/PCF 35 and AN/PCF 50. The AT 65 is also shown in this example as moving across the boundary of cell site 2 to cell site 3 as AT 65' along movement path 70.

When the AT 65 moves across the cell site boundary between cell site 2 and cell site 3, its physical connectivity changes from BTS 15 to BTS 20. The network must have a mechanism to handoff the AT 65 from BTS 15 to BTS 20 when making this change. In this type of handoff, the source AN/PCF 45 allows the AT 65 to add a cell under the control of AN/PCF 50 to its active set and switch to that cell site and connectivity for routing. A bearer path is required between the source AN 45 and the target AN 50 to transfer the information packet traffic. Finally, there is also a BTS 25 coupled to the AN/PCF 50 by communication link 24.

Figure 2:
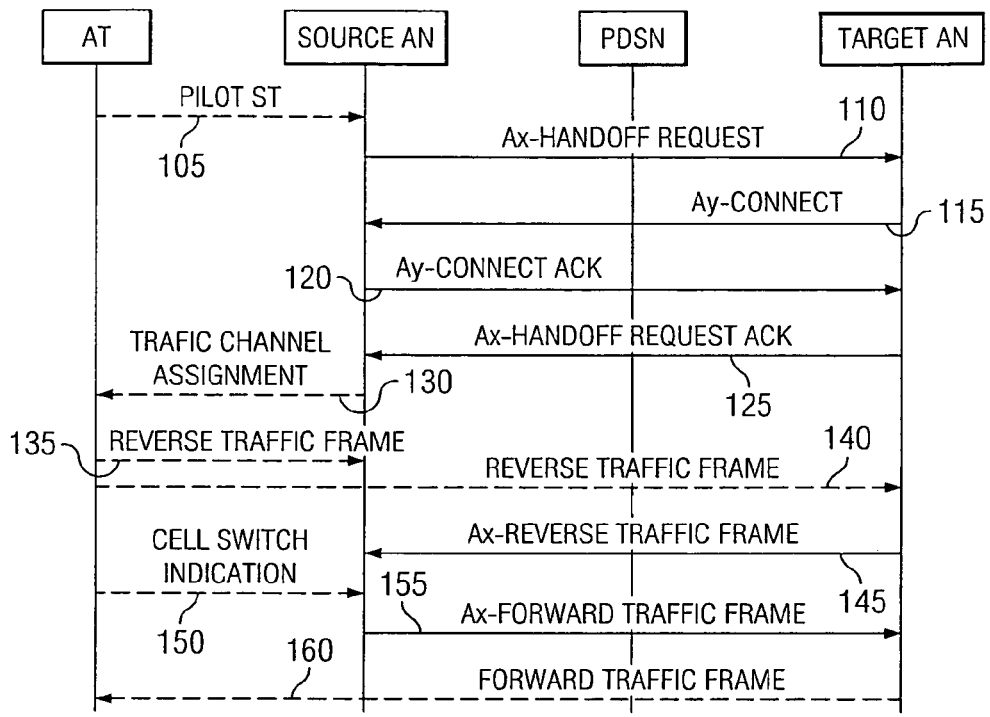
FIG. 2 shows a message flow for handoff on an Inter-AN cell selection.

FIG. 2 shows the message flow for accomplishing this type of handoff, which can be referred to an inter-AN cell selection handoff. In step 105, the AT transmits an information packet (PILOT ST) to the Source AN with information on the pilot strength for a cell or cells under control of the Target AN. The pilot strength is the ratio of the pilot power to the total power in the signal bandwidth of the code channels from the BTS to the ATs on the cell. The pilot strength signal indicates that the AT has moved far from the current BTS and needs to change connectivity to another cell site with a stronger signal. This message can comprise a route update message.

In step 110, the Source AN transmits an Ax-Handoff Request message to establish an inter-AN handoff with the Target AN that hosts the same or all of the cells reported by the AT in step 105. The Source AN locks the session state information record (SSIR) for the AT. The SSIR includes the air interface protocol attributes and associated public data which includes the configuration attributes. This message also signals the Target AN to establish a bearer path communication link between the Source AN and Target AN using the Ax signaling interface which creates the Ay bearer path interface. The Ax Hand-off Request message includes the SSIR and cell identifiers for all the cells under control of the target AN available for allocating radio resources on both the forward and reverse links to support communication with the AT.

In step 115, the Target AN/PCF establishes Ay traffic connections (e.g. bearer paths) for all cells for which radio resources can be committed by sending an Ay Connect message to the Source AN/PCF. A single Ay Connect message can be used to establish multiple Ay traffic connections, or each Ay traffic connection can be established by a separate Ay Connect message. In step 120, the Source AN/PCF responds with an Ay Connect Acknowledge message (Ay Connect Ack) to complete the Ay connection and establish the bearer paths from the Source AN/PCF to the identified cells via the Target AN/PCF. In step 125, the Target AN/PCF transmits an Ay Handoff Request Acknowledge (Ay Handoff Ack) message to the Source AN/PCF that contains a list of cells at which radio resources were successfully committed on both the forward and reverse links and for which an Ay bearer path connection was established. In step 130, the Source AN/PCF sends a Traffic Channel Assignment message to the AT with the committed resources reported in step 125.

In step 135, the AT transmits the reverse link traffic frames to the Source AT, and in step 140 the AT transmits the reverse link traffic frames to the Target AN/PCF as the respective cells are available on the AT active set. At this point, the AT can begin to transmit reverse direction traffic via the Target AN/PCF. In step 145, the reverse link traffic frames received at the Target AN/PCF are transmitted across the Ax interface in an Ax-Reverse Traffic message. The Ax-Reverse Traffic message includes a timestamp based on the CDMA system time corresponding to the reception of the first bit of the reverse link traffic frame at the channel element of the target BTS. This timestamp is used by the Source AN/PCF to identify the same decoded traffic frame received from multiple BTSs, providing the Source AN/PCF the ability to achieve multi-link diversity.

In step 150, the AT indicates its intention to switch to a new cell via the Data Source Control (DSC) channel. The Data Source Control Channel is used by the AT to indicate the selected cell on the forward channel to the AN/PCF. After the switch, the AT only receives forward link traffic frames via the Target AN/PCF. In step 155, after the Source AN/PCF receives a forwarded data packet from the PDSN, it transmits the data packets to the Target AN/PCF using an Ax Forward Traffic Frame. In step 160, the Target AN/PCF forwards data packets to the AT using Forward Traffic Frames (e.g. forward data frames) on the traffic channel or bearer path and indicating completion of the handoff. The established bearer path is thus as follows:

PDSN←—$^{A10}$—→Source AN/PCF–$^{Ay}$—→
    Target AN/PCF–→AT

Figure 3:
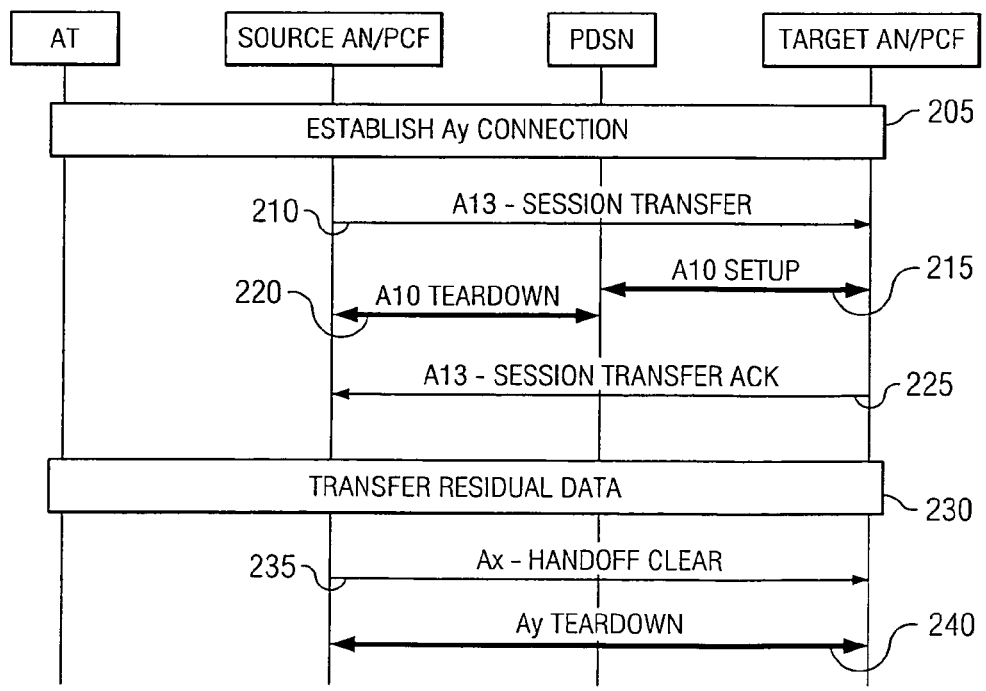
FIG. 3 shows a message flow for handoff on an inter-AN proactive session transfer.

FIG. 3 shows message flow for handoff on an inter-AN proactive session transfer. In this type of handoff, some triggering mechanism, such as a trigger algorithm, initiates the transfer. This can comprise a Route Update message indicating that the AT is located too far from the Source AN AP. In step 205, if no Ay connections currently exist, the Source AN/PCF and Target AN/PCF establish Ay connections (Establish Ay Connection) between them and determine that the A10 interface must be transferred from the Source AN/PCF to the Target AN/PCF. In step 210, the Source AN/PCF contacts the Target AN/PCF via the A13 interface to initiate the process to request the session transfer handoff of the communication session to the Target AN/PCF with an A13 Session Transfer message. The SSIR information does not need to be included because it is transferred to the Target AN/PCF at the time of the establishment of the Ay connections. However, if there are no current Ay connections between the Source AN/PCF and Target AN/PCF, the session state information record (SSIR) is also transferred at this step.

In step 215, A10 interface setup procedures (A10 Setup) are performed between Target AN/PCF and PDSN to establish A8/A10 interface connections for the Target AN/PCF and the PDSN. The A8 interface connection carries user traffic between the Target AN/PCF and the PCF functionality on the Target AN/PCF, while the A10 interface connection carries user traffic between the Target AN/PCF and the PDSN. If the PDSN chosen is different from the source PDSN, fast handoffs may be used to delay point-to-point protocol (PPP) negotiation between the AT and the target PDSN.

In step 220, the stale A8/A10 connections between the Source AN/PCF and the PDSN are torn down (A10 Teardown), and the SSIRs are unlocked and the AT moved to the Target AN/PCF. In step 225, the Target AN/PCF transmits an A13-Session Transfer Ack message to the Source AN/PCF indicating completion of the session transfer handoff procedures establishing a bearer path from the Target AN/PCF to the AT. This step may occur in parallel with step 220. In step 230, the residual data at the Source AN/PCF is transferred to the Target AN (e.g. Transfer Residual Data) via the respective Ay connections. The Target AN/PCF tags the residual data packets from the Source AN/PCF, as specified by a route selection protocol (e.g. such as defined by the TIA-154 standard), enabling the AT to distinguish between the residual Source AN/PDF packets and packets received at the Target AN/PCF directly from the PDSN. This marking process is transparent to the Ay interface connection. The AT communicates only with the target BTS to perform this purge.

After all the residual data from the Source AN/PCF has been transferred across the Ay interfaces, in step 235, the Source AN/PCF transmits an Ax-Handoff Clear message to the Target AN/PCF to indicate completion of residual data transfer. In step 240, in response to the Ax-Handoff Clear message received in step 235, the Target AN/PCF initiates the release of Ay connections (Ay Teardown) corresponding to the AT because these Ay connections are no longer used.

While the invention has been particularly shown and described with respect to preferred embodiments, it will be readily understood that minor changes in the details of the invention may be made without departing from the spirit of the invention.

Having described the invention, we claim:

1. A method for handoff of an access terminal from a source access network comprising the steps of:
    establishing a bearer path communication connection from said source access network;
    transmitting packet data as part of the bearer path communication, said packet data sent from a packet data serving node and an access terminal that is moving from a first base transceiver station connection on the source access network;
    transmitting a message from the source access network that requests transfer of the access terminal;
    transmitting a session state information record to communicate the air interface protocol attributes and the configuration attributes of the access terminal and at least one cell site identifier; and
    receiving a message at the source access network indicating completion of the transfer procedures to establish a new bearer path to the access terminal.

2. The method for handoff of an access terminal from a source access network of claim 1, wherein the handoff is initiated by the source access network receiving pilot strength information from the access terminal.

3. The method for handoff of an access terminal from a source access network of claim 1, wherein the handoff is initiated by a trigger algorithm.

4. The method for handoff of an access terminal from a source access network of claim 1, wherein the message to request transfer is a handoff request message.

5. The method for handoff of an access terminal from a source access network of claim 4, wherein the message to indicate completion of the handoff comprises a forward traffic frame containing packet data forwarded on a bearer path traffic channel.

6. The method for handoff of an access terminal from a source access network of claim 1, wherein the message to request transfer is a session transfer message.

7. The method for handoff of an access terminal from a source access network of claim 6, wherein the message to indicate completion of the handoff comprises a session transfer acknowledge message.

8. A method to handoff session communication from a source access network comprising the steps of:
    receiving a data element indicator at the source access network transmitted from an access terminal indicating that a hand-off procedure should be initiated, said indicator locks session state information for the access terminal;
    transmitting a handoff request message from the source access network comprising said session state information and at least one cell site identifier;
    allocating radio resources on a forward link and a reverse link for the access terminal on at least one identified cell site;
    establishing a bearer path connection between at least one identified cell site and the source access network; and
    receiving a handoff request acknowledge message at the source access network comprising a listing of at least one cell site where radio resources were allocated and a bearer path established.

9. The method to handoff session communication from a source access network claim 8, further comprising the steps of:
    receiving a reverse link traffic frame at the source access network; and
    transmitting a forward link traffic frame from the source access network.

10. The method to handoff session communication from a source access network of claim 9, further comprising the step of:
receiving a forward link traffic frame at the access terminal.

11. The method to handoff session communication from a source access network of claim 8, further comprising the steps of:
transmitting a message from the source access network to the access terminal comprising the listing of at least one cell site where radio resources were allocated and a bearer path established;
receiving a reverse link traffic frame at the source access network transmitted by the access terminal; and
receiving a message at the source access network indicating a cell site at which the access terminal establishes connection.

12. The method to handoff session communication from a source access network of claim 11, further comprising the step of:
transmitting a reverse link traffic frame by the access terminal.

13. The method to handoff session communication from a source access network of claim 11, wherein the message received at the source access network indicating the cell site connection uses a data source control channel.

14. A method to transfer session communication from a source access network comprising the steps of:
receiving a trigger data input indicator at the source access network initiating the session communication transfer in a predetermined circumstance;
establishing a bearer path communication interface with the source access network;
initiating session transfer with a session transfer message transmitted from the source access network using a communication interface carrying signaling information between a packet control function of the source access network;
transmitting a session state information record for an access terminal from the source access network;
establishing a communication interface connection to forward session communication data to the access terminal;
receiving a session transfer acknowledge message at the source access terminal indicating completion of the session handoff and establishing a bearer path to the access terminal; and
forwarding a session data packet to the access terminal transmitted from said packet data serving node using said bearer path.

15. The method to transfer session communication from a source access network of claim 14, further comprising the steps of:
establishing a first communication interface, said first communication interface carrying user traffic;
establishing a second communication interface, said second communication interface carrying user traffic; and
transmitting user traffic from the packet data serving node via the packet control function using both communication interfaces.

16. The method to transfer session communication from a source access network of claim 15, further comprising the steps of:
terminating a first stale communication interface between the source access network and its packet control function, said first stale communication interface having carried user traffic;
terminating a second stale communication interface between the source access network packet control function and the packet data serving node, said second stale communication interface having carried user traffic;
unlocking the session state information record; and
moving the access terminal connection away from the source access network.

17. The method to transfer session communication from a source access network of claim 15, further comprising the step of:
delaying a point-to-point protocol from the packet data serving node by performing a fast handoff procedure.

18. The method to transfer session communication from a source access network of claim 15, further comprising the step of:
transferring residual packet data at the source access network to a base transceiver station access point, said residual packet data from the source access network distinguished from data packets received originating from the packet data serving node.

19. The method to transfer session communication from a source access network of claim 18, wherein said residual packets are tagged by a route selection protocol to distinguish the residual packets.

20. The method to transfer session communication from a source access network of claim 15, further comprising the step of:
initiating bearer path communication link termination between the source access network and the access terminal.

* * * * *

UNITED STATES PATENT AND TRADEMARK OFFICE
CERTIFICATE OF CORRECTION

| | |
|---|---|
| PATENT NO. | : 8,019,343 B2 |
| APPLICATION NO. | : 12/387621 |
| DATED | : September 13, 2011 |
| INVENTOR(S) | : Surya Tenneti, Sanket Nesargi and Jun Li |

It is certified that error appears in the above-identified patent and that said Letters Patent is hereby corrected as shown below:

Col. 9 Line 43 in Claim 14, in the phrase "receiving a session transfer acknowledge message at the source access terminal indicating completion of the session handoff and establishing a bearer path to the access terminal," replace the phrase "source access terminal" with "source access network."

Signed and Sealed this
Eighth Day of November, 2011

David J. Kappos
*Director of the United States Patent and Trademark Office*